United States Patent
Wyker

(10) Patent No.: US 6,220,749 B1
(45) Date of Patent: Apr. 24, 2001

(54) SELF-ADJUSTING TEMPERATURE SENSOR

(75) Inventor: Christopher A. Wyker, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/285,868

(22) Filed: Apr. 2, 1999

(51) Int. Cl.[7] .............................. G01K 1/14; G01K 13/08
(52) U.S. Cl. ................................ 374/141; 374/208
(58) Field of Search .............................. 374/208, 179, 374/141, 152

(56) References Cited

U.S. PATENT DOCUMENTS

| | | | |
|---|---|---|---|
| 4,355,912 | * 10/1982 | Haak | 374/208 |
| 4,552,465 | * 11/1985 | Anderson | 374/208 |
| 4,638,668 | * 1/1987 | Leverberg et al. | 374/208 |
| 4,979,831 | * 12/1990 | Schertz et al. | 374/208 |
| 4,991,976 | * 2/1991 | Byles | 374/208 |
| 5,632,557 | * 5/1997 | Simons | 374/208 |
| 5,662,418 | * 9/1997 | Deak et al. | 374/208 |
| 5,667,306 | * 9/1997 | Montreuil et al. | 374/208 |
| 5,999,081 | * 12/1999 | Hannigan et al. | 374/208 |
| 6,045,261 | * 4/2000 | Rossum et al. | 374/208 |

FOREIGN PATENT DOCUMENTS

| | | | |
|---|---|---|---|
| 48511 | * 11/1985 | (JP) | 374/141 |
| 48812 | * 12/1998 | (JP) | 374/208 |

OTHER PUBLICATIONS

Advertising Brochure, "Extruder RTD Probes, Bayonet and Compression Fitting Styles", pp C–8 andA–92 Date Unknown.

* cited by examiner

Primary Examiner—Diego Gutierrez
Assistant Examiner—Madeline Gonzalez
(74) Attorney, Agent, or Firm—Wall Marjama & Bilinski

(57) ABSTRACT

Self-adjusting apparatus for sensing the temperature of a body that is subject to displacement. An elongated probe having an electrical sensing element at its distal end is slidably contained in a hole passing through a threaded housing. A close running fit is provided between the housing and the probe so that it can move only axially in the hole. A stop is mounted on the probe between the bottom wall of the housing and the distal end of the probe. A spring is coiled about the probe so that it acts to bias the probe into contact with the body when the housing is threaded into a support member.

9 Claims, 3 Drawing Sheets

SELF-ADJUSTING TEMPERATURE SENSOR

BACKGROUND OF THE INVENTION

In centrifugal compressors, an impeller is mounted upon a drive shaft and the shaft is rotated at high speeds by a motor acting through a transmission. The drive shaft is typically rotatably supported in one or more roller bearings. Overheating of the bearings can give clear indication that the compressor drive train is experiencing some type of problem that could eventually result in damage to one or more drive components. It is therefore desirable to monitor the temperature of at least one of the support bearings in the impeller drive train so that preventative measures can be taken to insure that the drive system does not become damaged or the compressor require replacement.

One way to monitor the performance of roller bearings is to place a temperature probe in direct contact with the outer race of the bearing. Some probes typically have a fixed length and, as a consequence, contact between the probe and the bearing can be lost due to thermal deformation of parts or mechanical vibrations. Self-adjusting temperature devices are known in the art, however, these devices for the most part, are relatively complex, difficult to install, and susceptible to misalignment problems and breakage.

SUMMARY OF THE INVENTION

It is therefore an object of the present invention to improve centrifugal compressors of the type used in refrigeration systems.

It is a further object of the present invention to improve self-adjusting temperature sensors that are suitable for use in monitoring the bearing temperatures in a drive system and, in particular, a centrifugal compressor drive system.

It is a still further object of the present invention to provide a relatively simple and easy to install self-adjusting temperature probe.

Another object of the present invention is to provide an improved self-adjusting temperature probe for monitoring the temperature of a bearing surface that is subjected to both thermal and mechanical displacement.

These and other objects of the present invention are attained by a self-adjusting temperature sensing apparatus that includes an elongated probe having an electrical temperature sensor mounted in its distal end section so that when the probe is brought into contact with a body, the sensor will provide an electrical output signal indicative of the body temperature. The probe is slidably contained within an opening that passes through a housing. A close running fit is provided between the probe and the opening in the housing so that the probe can only move reciprocally along the axis of the opening. The housing contains a threaded section which enables it to be threadably mounted in a support member adjacent the body that is being monitored. A first stop is mounted upon the probe between the bottom wall of the housing and the distal end of the probe and a compression spring is wound about the probe between the first stop and the housing for biasing the probe into riding contact against the body being monitored. A second stop is also mounted on the probe between the proximal end of the probe and the top wall of the housing that prevents the probe from passing out of the housing. The spacing between the two stops is such that the spring will normally hold the second stop against the housing in the event the housing is removed from the support.

BRIEF DESCRIPTION OF THE DRAWINGS

For a better understanding of these and other objects of the present invention, reference will be made to the following detailed description of the invention which is to be read in conjunction with the accompanying drawing wherein.

DESCRIPTION OF THE INVENTION

Figure 1:
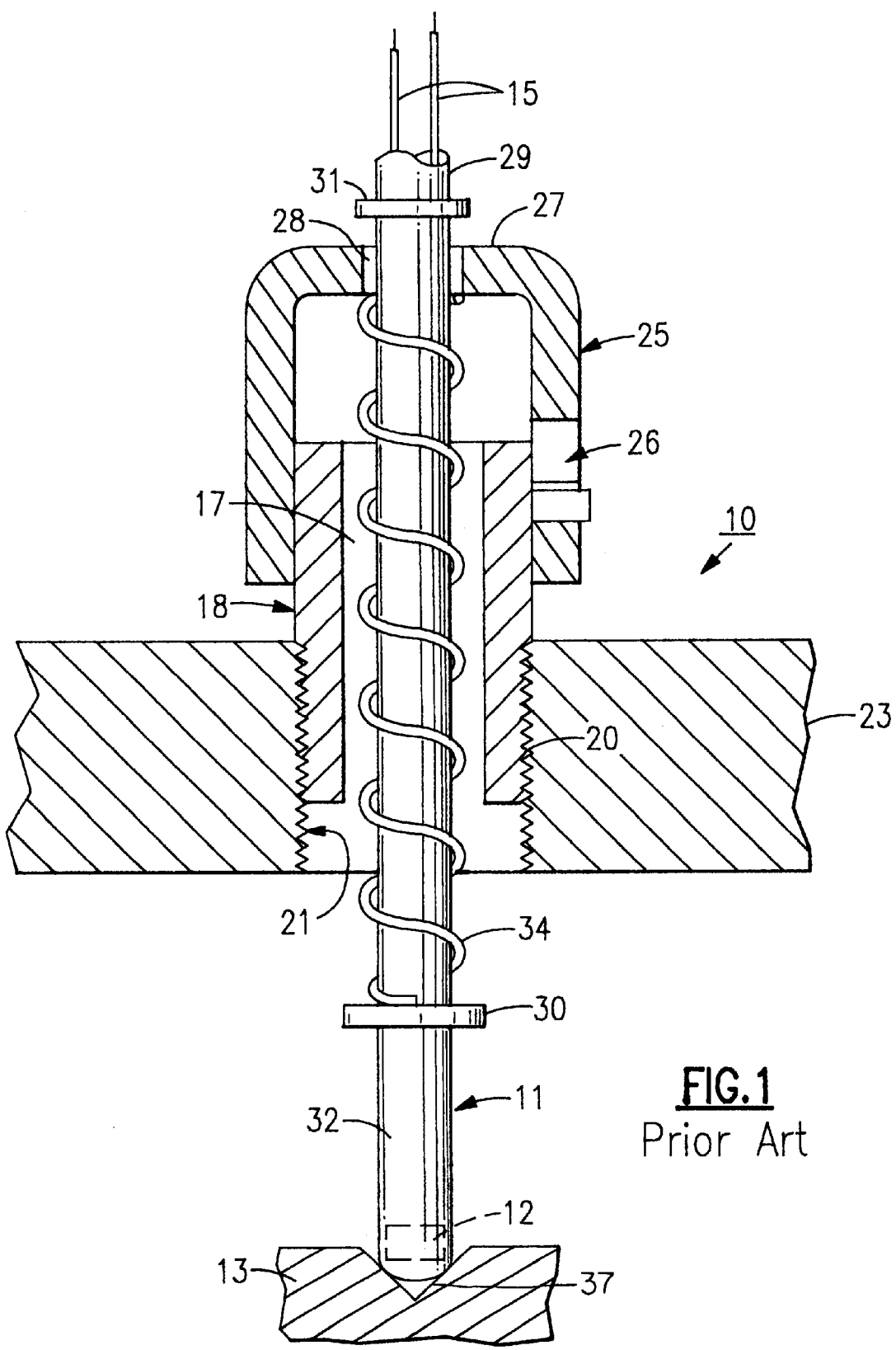
FIG. 1 is a side elevation in section illustrating a self-adjusting temperature sensor found in the prior art.

Referring initially to FIG. 1, there is illustrated a self-adjusting temperature measuring device, generally referenced 10, that is presently known and used in the prior art. The device includes an elongated cylindrical probe 11 having an electrical sensor 12 mounted at its distal end for sensing the temperature of a body 13 and providing an electrical output signal indicative of the sensed temperature via one or more leads 15. The probe is loosely contained within an opening 17 provided in a housing 18 so that the probe passes through the housing. The front end of the housing contains a male thread 20 that is adapted to mate with female thread 21 formed within a stationary support member 23 when the sensor is placed in use. The top of the housing is closed by a cup shaped cap 25 that is closely fitted over the top section of the housing and secured in place by means of a bayonet coupling 26. The top wall 27 of the cap further includes an opening 28 through which the proximal end of the probe 29 extends.

A first annular shaped front stop 30 is mounted upon the probe near its distal end 32. A second annular rear stop 31 is also mounted on the probe near is proximal end. The second stop, in assembly, is located outside the cap and has a diameter such that it can rest in contact against the top surface 27 of the cap. A compression spring 34 is wound about the probe so that one end of the spring contacts the front stop while the opposite end of the spring passes through the opening in the housing and contacts the inside surface of the top wall of the cap. In assembly, the spring is mounted in a loaded condition between the front stop of the probe and the cap so that the cap is biased into contact against the second stop. The biasing action of the spring thus positions the probe along the axis of the opening in the housing. The probe is otherwise unsupported in assembly.

As can be seen from FIG. 1, the prior art probe, when placed in contact against a body, is relatively unsupported along its entire length, and can be easily moved off axis to a skewed position. This, in turn, can cause the probe to provide erroneous readings and, in some cases, cause the probe to become damaged as the housing is threaded into the support member. In addition, because the probe is relatively unsupported, it is extremely difficult to properly align the probe at the time of installation. As illustrated in FIG. 1, a groove 37 is sometimes machined in the receiving body into which the probe can be inserted to help facilitate proper alignment during installation. However, machining of the body is, in many cases, not possible because the body is unaccessible or can not be machined without causing damage to the part. It should be further noted that the body being monitored can also be subject to both mechanical and thermal displacement which can produce unwanted misalignment of the probe after installation. Because the probe is relatively unsupported, it will not return to its original position after the thermal or mechanical stresses are relieved. Here again, an improperly aligned probe can produce erroneous temperature related readings and is more susceptible to damage. Lastly, because the spring is the only element that holds the probe in alignment in assembly, the spring, by necessity, must be of comparatively high strength, making movement of the probe difficult.

Figure 2:
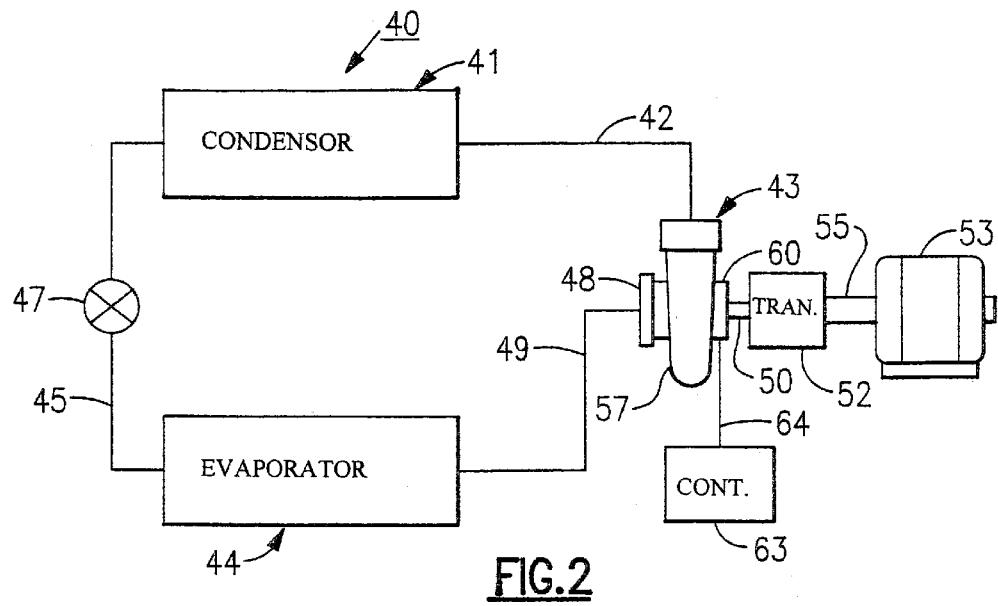
FIG. 2 is a schematic illustration relating to a refrigeration system employing the apparatus of the present invention to monitor the temperature of a roller bearing in the compressor drive train.

A refrigeration system is illustrated schematically in FIG. 2. The system is designated 40 and contains a condenser 41 that is adapted to receive high pressure and temperature refrigerant vapor via a discharge line 42 from the discharge side of a centrifugal compressor 43. Energy is rejected from the refrigerant into a coolant within the condenser to reduce the vapor to a liquid. The condensed refrigerant is then passed to the system evaporator 44 by means of a refrigerant line 45. An expansion device 47, such as a throttling valve is contained in the refrigerant line which throttles the refrigerant to a lower temperature and pressure.

In the evaporator the low temperature refrigerant absorbs heat from a substance being chilled and vapor generated by the evaporation process is delivered to the inlet 48 of the compressor via supply line 49 so that the refrigerant can once again be recycled through the system.

The impeller (not shown) of the centrifugal compressor 43 is mounted for rotation upon a drive shaft 50. The drive shaft, in turn, is connected to a transmission 52 that is powered by a motor 53 through the motor shaft 55. As will be explained in greater detail below, the compressor casing 57 contains a bearing block 60 that houses a roller bearing for rotatably supporting the drive shaft 50. As noted above, it is highly desirous in this type of drive system to monitor the temperature of at least one of the drive train bearings in order to ascertain if the drive unit is operating properly. In the event the bearing begins to overheat, corrective action must be taken within a relatively short period of time in order to prevent damage from occurring to the compressor and its associated drive system. As will be explained below, a temperature sensing device embodying the teachings of the present invention is mounted in the bearing block of the compressor and arranged to send an electrical signal relating to the actual bearing temperature to a controller 63 by means of transmission line 64. The controller is programmed to shut down the compressor in the event an over-heated bearing is detected.

Figure 3:
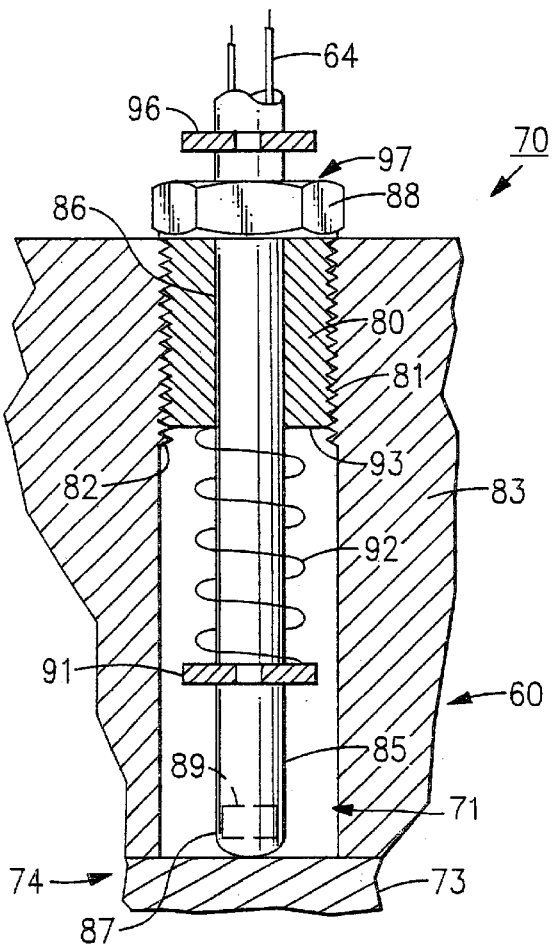
FIG. 3 is a side elevation in section illustrating a self-adjusting temperature sensor embodying the teachings of the present invention.
Figure 4:
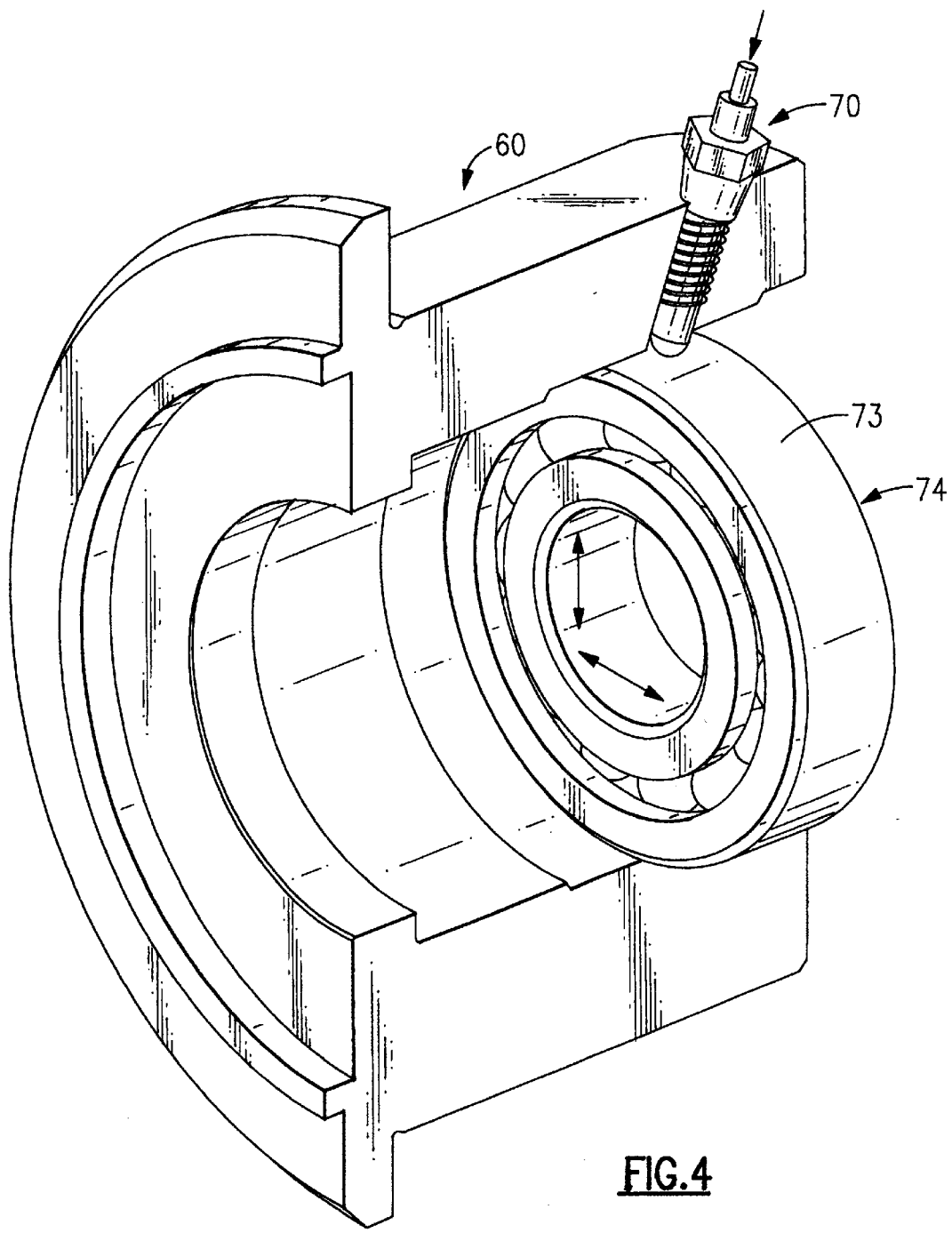
FIG. 4 is a perspective view showing a temperature sensor embodying the teachings of the present invention mounted in the bearing housing of a centrifigal compressor used in the refrigeration system shown in FIG. 2.

Turning now to FIGS. 3 and 4, there is illustrated a temperature sensing device, generally referenced 70, that embodies the teaching of the present invention. The sensor is ideally suited for installation in the compressor of a refrigeration system of the type described above. The sensor can be mounted within a hole 71 formed in the bearing block 60 adjacent to the outer race 73 of a roller bearing 74, that is journalled for rotation in the bearing block. Although the bearing block is shown in this embodiment of the invention as being part of the compressor casing, it can also be located in the transmission case 52 that forms a part of the compressor drive system. Drive shaft 50 is rotatably supported in the bearing and, as such, the bearing can shift its position due to both thermal and mechanical forces generated as the shaft turns at high speed. As a consequence, prior art probes similar to that described above can easily become misaligned or damaged at installation or as they try to comply with the dimensional changes caused by these forces.

Although the present invention shall be described with specific reference to sensing the temperature of a roller bearing, it should be clear to one skilled in the art that the present invention has wider application and can be used to accurately provide temperature data related to any type of part that is subjected to external forces that might cause the part to be displaced under dynamic or high temperature operating conditions.

With further reference to FIG. 3, the apparatus of the present invention includes a housing 80 that has a threaded section 81 that mates with a taped hole 82 formed in the body 83 of bearing block 60. The hole is positioned directly over the outer race 73 of bearing 74 that rotatably supports the shaft 50 of a refrigerant compressor 45 (FIG. 2). A cylindrical elongated probe 85 is slidably contained within a hole 86 that passes axially through the housing. A close running fit is provided between the probe and the inner wall of the hole 86 so that the probe can only move axially within the housing. The probe if of sufficient length so that its distal end tip 87, which is rounded, can ride in contact with the surface of the bearing's outer race. The housing contains a hexagon shaped head 88 at its upper end to facilitate threading of the housing into the bearing block. Although the probe body has a cylindrical shape, it can take any form that will insure a close running fit inside the housing opening so that the probe will not become misaligned in the housing.

An electronic heat sensor 89 is mounted at the distal tip of the probe and electrical leads 64 pass upwardly through the probe and pass out of its proximal end. As illustrated in FIG. 2, the sensor leads are connected to a processor 63 that is adapted to analyze temperature related data and provide an output signal that can be used to initiate necessary corrective action in the event an overheat condition is detected.

A first stop 91 is secured to the probe between the bottom surface 93 of the housing and the distal tip 87 of the probe. A coil compression spring 92 encircles the probe and is arranged to act between the housing and the stop to urge the tip of the probe into seating contact against the outer race of the bearing when the housing is threaded into the bearing block. Because the spring does not have to provide a locating or aligning function as required of the spring utilized in the prior art device, a relatively soft spring can be employed which permits the probe to more readily comply with any changes in the position of the bearing.

As should be evident, the probe can only reciprocate along the axis of the housing and thus cannot become misaligned in the event the bearing moves or shifts position. In addition, the sensor's overall length can be greatly reduced when compared to similar prior art devices. The sensor probe will also remain aligned even in the event the surface being sensed is irregular or not exactly perpendicular to the axis of the probe. The axial length of the hole provided in the housing should be about twice the diameter of the probe in order to properly support the probe in assembly and prevent misalignment of the probe due to exterior thermal and mechanical forces.

A second stop 96 is also secured to the probe outside of the sensor housing adjacent the top surface 97 of the housing. The second stop prevents the housing from passing over the proximal end of the probe when the sensor is removed from the bearing block or any other support in which it is mounted. In practice, the stops can be C-clamps that are mounted in grooves or recesses formed in the shank of the probe. The spacing between the stops is preferably such that the spring is normally held in a loaded condition between the housing and the first stop when the top surface of the housing is seated against the second stop. In this manner, the component parts of the sensor will not become separated when the housing is removed from a supporting member such as the bearing block 60.

While this invention has been explained with reference to the structure disclosed herein, it is not confined to the details set forth and this invention is intended to cover any modifications and changes as may come within the scope of the following claims:

What is claimed is:

1. Apparatus for sensing the temperature in combination with a refrigeration compressor that includes:
   a bearing block located in the refrigeration compressor,
   a bearing mounted in said bearing block for rotatably supporting the compressor drive shaft,
   an elongated probe having a sensing element at its distal end that is capable of riding in contact with an outer race of said bearing and providing an output signal indicative of the temperature of said bearing,
   a housing mounted in a receiving hole formed in a bearing block, said housing having an opening passing axially therethrough for slidably containing said probe and providing a close running fit between the probe and the inner wall of the opening so that the probe can only move axially within the housing,
   a first stop mounted upon said probe between the distal end of the probe and a bottom surface of the housing, and
   a spring acting between the first stop and the front wall of the housing for urging the distal end of the probe into biasing contact against said bearing.

2. The apparatus of claim 1 wherein said spring is a coil spring that is wound around the probe.

3. The apparatus of claim 1 wherein said housing contains a threaded section that is arranged to mate with a threaded section in the hole in said bearing block.

4. The apparatus of claim 3 wherein said sensor housing further includes a hexagon shaped head section to facilitate threading said housing in said hole.

5. The apparatus of claim 1 wherein said probe is a cylindrical member and the axial length of the opening in said housing is about twice the diameter of the probe.

6. The apparatus of claim 5 wherein the distal tip of said probe is rounded.

7. The apparatus of claim 1 wherein said bearing block is mounted in a casing of the compressor.

8. The apparatus of claim 1 wherein said bearing block is mounted in a transmission that is operatively associated with the compressor.

9. The apparatus of claim 1 that further includes electrical leads passing out of the proximal end of said probe for connecting the sensing element with a processor.

* * * * *